United States Patent Office 3,078,285
Patented Feb. 19, 1963

3,078,285
12-ALKYL STEROIDS OF THE PREGNANE SERIES
Josef Fried, Princeton, N.J., assignor to Olin Mathieson Chemical Corporation, New York, N.Y., a corporation of Virginia
No Drawing. Filed Dec. 6, 1957, Ser. No. 700,937
2 Claims. (Cl. 260—397.45)

This invention relates to the synthesis of steroids, and has for its object the provision of a new class of physiologically active steroids, which may be represented by the formula

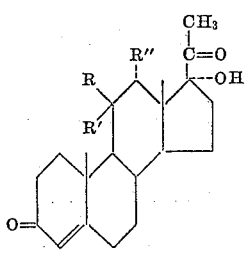

wherein R is hydrogen, R' is α-hydroxy, α-acyloxy, or β-hydroxy, or together R and R' is keto, and R" is lower alkyl (preferably methyl).

These new steroids of this invention are prepared through the new 21-iodo intermediate compounds of this invention from a 21-alkane sulfonic acid ester of a 12α-(lower alkyl)hydrocortisone. Suitable starting materials include the lower alkane sulfonic acid esters (e.g. mesyl and ethanesulfonyl) of 12α-methylhydrocortisone and 12α-ethylhydrocortisone. These starting materials are interacted with an alkali metal iodide (e.g. sodium iodide), preferably at an elevated temperature in an organic solvent for the steroid reactant, thereby yielding the corresponding 21-iodo derivatives [i.e. a 21 - iodo - 12α - (lower alkyl) - 11β,17α - dihydroxyprogesterone]. The new 21-iodo compounds thus formed are then treated with an alkali metal bisulfite (e.g. sodium bisulfite) to deiodate the intermediate thereby forming the 12α-(lower alkyl)-11β,17α-dihydroxyprogesterones of this invention.

The 11β-hydroxy steroids thus formed can then be oxidized in the usual manner, as by treatment with a hexavalent chromic compound (e.g. chromium trioxide) to yield the corresponding 11-keto derivatives [i.e. a 12α - (lower alkyl) - 11 - keto - 17α - hydroxyprogesterone]. The 11-keto compounds, moreover, can be ketalized, as by treatment with a dihydric alcohol (e.g. ethylene glycol) to yield the corresponding 3,20-diketal derivatives, which in turn can be reduced as by treatment with an alkali metal (e.g. lithium) in liquid ammonia, to yield the corresponding 11α-hydroxy derivatives. These 11α-hydroxy steroids can then be hydrolyzed, as by treatment in a suitable solvent such as methanol with a dilute aqueous acid at an elevated temperature, to yield the corresponding 3,20-diketone derivatives. Furthermore, the resulting 12α-(lower alkyl)-Δ⁴-pregnene-11α,17α-diol-3,20-dione can be acylated in 11α-position by treatment with a suitable acylhalide or acid anhydride, such as the acyl chloride or acid anhydride of a hydrocarbon carboxylic acid having less than ten carbon atoms, as exemplified by the lower alkanoic acids (e.g. acetic, propionic and enanthic acid), the monocyclic aromatic carboxylic acids (e.g. benzoic and toluic acid), the monocyclic aralkanoic acids (e.g. phenacetic and β-phenylpropionic acid), the lower alkenoic acids, the cycloalkane carboxylic acids, and the cycloalkene carboxylic acids, to yield the corresponding 11α-ester derivatives.

The final products of this invention, wherein free keto groups are present in the 3 and 20 positions are physiologically active substances which possess progestational activity. Hence, these steroids of this invention can be used in lieu of known progestational steroids, such as progesterone, in the treatment of habitual abortion, being formulated for such administration in the same type of peroral preparations as progesterone, for example, with concentrations and/or dosage based on the activity of the particular compound.

The series of steps employed to form the final products of this invention can be illustrated by the following equations wherein 12α-methylhydrocortisone mesylate is employed as the starting material. All of the starting materials used in the process of this invention can be prepared by the method disclosed in my U.S. application, Serial No. 700,934, filed on even date herewith, now abandoned.

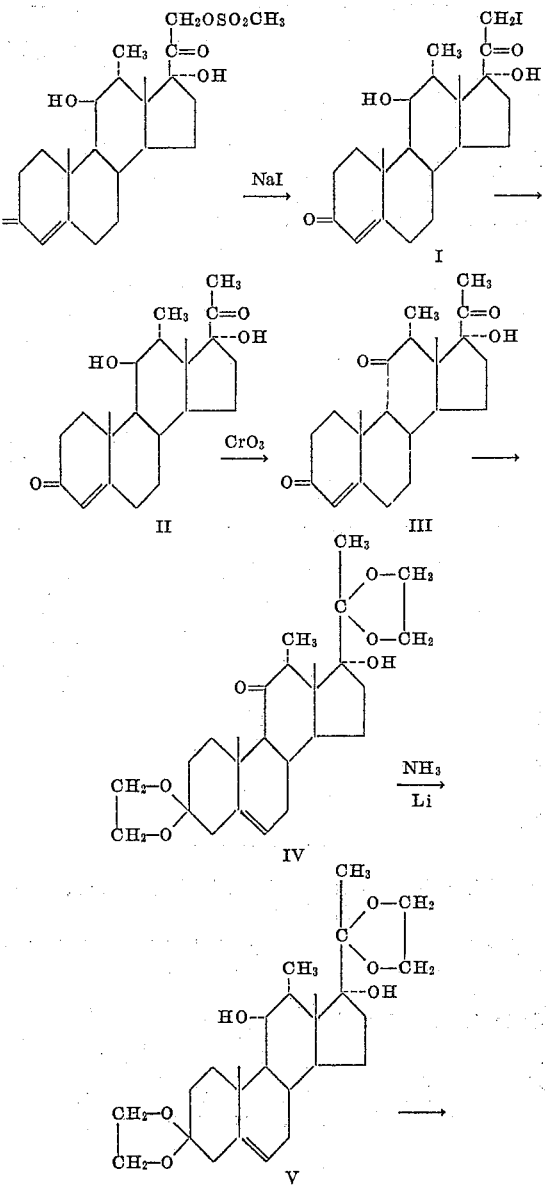

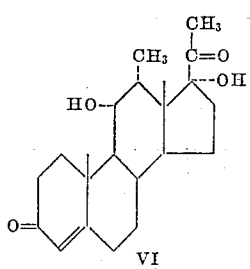

The following examples are illustrative of the invention (all temperatures being in centigrade):

EXAMPLE 1

*21-Iodo-12α-Methyl-11β,17α-Dihydroxyprogesterone (I)*

A mixture of 200 mg. of 12α-methylhydrocortisone 21-mesylate and 500 mg. of sodium iodide in 10 ml. of acetone is heated under reflux for 15 minutes. The reaction mixture is then diluted with water, the precipitated solid collected, washed with water and dried in vacuo. Crystallization from acetone-hexane yields a pure sample of the 21α-iodo compound (I).

EXAMPLE 2

*12α-Methyl-11β,17α-Dihydroxyprogesterone (II)*

To a solution of 127 mg. of 21-iodo-12α-methyl-11β, 17α-dihydroxyprogesterone in 1.5 ml. of dioxane is added at 80° 1.5 ml. of 5% aqueous sodium bisulfite, the reaction mixture then being heated for 30 minutes. The solution is cooled, water added and the steroids extracted with chloroform. The chloroform extract is washed with water, dried over sodium sulfate and evaporated to dryness in vacuo. Crystallization from acetone-hexane yields a sample of 12α-methyl-4-pregnene-11β, 17α-diol-3,20-dione (II).

Similarly, by substituting other 12α-(lower alkyl)hydrocortisone mesylates (e.g. 12α-ethylhydrocortisone mesylate) for the 12α-methyl steroid in Example 1 and following the procedures of Examples 1 and 2, the corresponding 21-iodo-12α(lower alkyl) intermediates are formed and the corresponding 12α-(lower alkyl)-11β,17α-dihydroxyprogesterones (e.g. 12α - ethyl - 11β,17α - dihydroxyprogesterone) are recovered as the final products,

EXAMPLE 3

*12α-Methyl-11-Keto-17α-Hydroxyprogesterone (III)*

To a stirred solution of 5 g. of 12α-methyl-11β,17α-dihydroxyprogesterone in 200 ml. of acetone is added chromium trioxide in 0.67 N sulfuric acid (200 mg./ml.) until a permanent brown coloration is obtained (about 5 ml. required). The solution is stirred at room temperature 30 minutes. Methanol is added to destroy the excess chromic acid and then the mixture is concentrated to about half its volume in vacuo. On adding water, the 11-ketone (III) separates from solution. The material is collected, washed with water, dried and crystallized from acetone-hexane.

EXAMPLE 4

*12α-Methyl-Δ⁵-Pregnene-17α-Ol-3,11,20-Trione 3,20-Bis-Ethylene Ketal (IV)*

A mixture of 3 g. of 12α-methyl-11-keto-17α-hydroxyprogesterone 150 ml. of benzene, 24 ml. of ethylene glycol and 48.4 mg. of p-toluene sulfonic acid monohydrate is heated under reflux for 24 hours, the water formed during the reaction being removed azeotropically in a suitable separator. The mixture is diluted with 200 ml. of chloroform and washed successively with dilute sodium bicarbonate and water. Evaporation in vacuo followed by crystallization of the residue from methanol yields 12α-methyl-Δ⁵-pregnene-17α-ol-3,11,20-trione 3,20-bis-ethylene ketal (IV).

EXAMPLE 5

*12α-Methyl-Δ⁵-Pregnene-11α,17α-Diol-3,20-Dione 3,20-Bis-Ethylene Ketal (V)*

To a solution of 200 mg. of 12α-methyl-Δ⁵-pregnene-17α-diol-3,11,20-trione 3,20-bis-ethylene ketal in 8 ml. of methanol and 50 ml. of liquid ammonia is added over a ten minute period, 160 mg. of finely cut lithium. The solvent is allowed to evaporate off at room temperature (about 2 hours) and the residue is triturated with water. The precipitated material is collected, washed with water and dried in vacuo. Crystallization from acetone-hexane yields 12α - methyl - Δ⁵ - pregnene - 11α,17α - diol - 3,20-dione 3,20-bis-ethylene ketal (V).

EXAMPLE 6

*12α-Methyl-Δ⁴-Pregnene-11α,17α-Diol-3,20-Dione (VI)*

A solution of 100 mg. of 12α-methyl-Δ⁵-pregnene-11α, 17α-diol-3,20-dione, 3,20-bis-ethylene ketal in 20 ml. of methanol and 0.8 ml. of 8% sulfuric acid is refluxed for 40 minutes. On dilution with water, 12α-methyl-Δ⁴-pregnene-11α,17α-diol-3,20-dione (VI) separates from solution. The steroid is filtered off, washed with water and dried in vacuo.

EXAMPLE 7

*12α-Methyl-Δ⁴-Pregnene-11α,17α-Diol-3,20-Dione 11-Acetate*

A solution of 50 mg. of 12α-methyl-Δ⁴-pregnene-11α, 17α-diol-3,20-dione in 1 ml. of pyridine and 0.4 ml. of acetic anhydride is heated at 80° for 3 hours. The mixture is then diluted with iced water, the precipitate collected, washed with water and dried in vacuo. Crystallization from acetone-hexane gives the pure 11α-acetate.

Similarly, by substituting other acylating agents for the acetic anhydride in Example 7, the corresponding acyloxy derivatives are formed. Thus, propionic anhydride and benzoyl chloride yield the propionate and benzoate esters, respectively.

Furthermore, if 12α-ethyl-11β,17α-dihydroxyprogesterone is substituted for the 12α-methyl-11β,17α-dihydroxyprogesterone in the procedure of Example 3 and the procedures of Examples 4 through 7 are followed, the corresponding 12α-ethyl derivatives are obtained, respectively.

The invention may be variously otherwise embodied within the scope of the appended claims.

What is claimed is:

1. An 11α-ester of 12α-(lower alkyl)-Δ⁴-pregnene-11α, 17α-diol-3,20-dione and a hydrocarbon carboxylic acid having less than ten carbon atoms.

2. 12α-methyl-Δ⁴-pregnene-11α,17α-diol-3,20-dione 11-acetate.

References Cited in the file of this patent

UNITED STATES PATENTS

| | | |
|---|---|---|
| 2,602,769 | Murray et al. | July 8, 1952 |
| 2,713,587 | Bergstrom | July 19, 1955 |
| 2,865,935 | Schneider et al. | Dec. 23, 1958 |
| 2,867,633 | Lincoln et al. | Jan. 6, 1959 |
| 2,870,177 | Conbere et al. | Jan. 20, 1959 |
| 2,897,219 | Wettstein et al. | July 28, 1959 |

OTHER REFERENCES

Kritchevsky et al.: J.A.C.S., vol. 74, pages 483–6 (1952).

Levin et al.: J.A.C.S., vol. 76, pages 546–52 (1954).